US00RE42196E

(19) United States
(12) Reissued Patent
Jung

(10) Patent Number: US RE42,196 E
(45) Date of Reissued Patent: Mar. 1, 2011

(54) SYSTEM AND METHOD FOR BLOCKING HARMFUL INFORMATION ONLINE, AND COMPUTER READABLE MEDIUM THEREFOR

(75) Inventor: Yeon-Sub Jung, Seoul (KR)

(73) Assignee: INCA Internet Co., Ltd., Seoul (KR)

(21) Appl. No.: 12/137,871

(22) Filed: Jun. 12, 2008

Related U.S. Patent Documents

Reissue of:
(64) Patent No.: 7,062,552
Issued: Jun. 13, 2006
Appl. No.: 10/188,161
Filed: Jul. 1, 2002

U.S. Applications:
(63) Continuation of application No. PCT/KR00/01374, filed on Nov. 28, 2000.

(30) Foreign Application Priority Data

Mar. 7, 1999 (KR) ..... 2000-11282
Dec. 31, 1999 (KR) ..... 1999-68606

(51) Int. Cl.
*G06F 15/16* (2006.01)

(52) U.S. Cl. ..... 709/224
(58) Field of Classification Search ..... 709/224, 709/227, 237, 246
See application file for complete search history.

(56) References Cited

U.S. PATENT DOCUMENTS 5,367,682 A * 11/1994 Chang ..... 713/1
5,706,507 A 1/1998 Schloss
5,790,753 A 8/1998 Krishnamoorthy et al.
5,808,751 A * 9/1998 Hochman ..... 358/400
5,960,170 A 9/1999 Chen et al.
5,987,611 A 11/1999 Freund
5,995,756 A 11/1999 Herrmann
6,006,034 A 12/1999 Heath et al.
6,014,698 A 1/2000 Griffiths
6,049,892 A 4/2000 Casagrande et al.
6,075,863 A 6/2000 Krishnan et al.
6,088,803 A 7/2000 Tso et al.
6,119,165 A 9/2000 Li et al.
6,125,352 A 9/2000 Franklin et al.
6,672,775 B1 1/2004 Narayanaswami
6,742,047 B1 5/2004 Tso
6,785,732 B1 8/2004 Bates et al.
7,484,244 B2 * 1/2009 Nagoya et al. ..... 726/24

FOREIGN PATENT DOCUMENTS

JP 10240828 9/1998

(Continued)

OTHER PUBLICATIONS

Rothwell, Phil, et al., "Anti–Virus Software for NetWare Users", Network Computing, pp. 20–26, Apr. 1996.

(Continued)

*Primary Examiner*—David Y Eng
(74) *Attorney, Agent, or Firm*—Kile Park Goekjian Reed & McManus PLLC

(57) ABSTRACT

A system and method are provided for diagnosing, remedying and blocking harmful information including computer viruses online over a computer network via which a web server and a client are linked to each other. The method includes, on a computer network through which a web server and a client system are linked to each other, the web server receiving a connection request from the client system over the computer network. Then, the web server transmits a harmful information blocking code module to the client system. Once the transmission of the harmful information blocking code module is completed the harmful information blocking code module automatically runs on the client system to block in real time harmful information including computer viruses. The harmful information blocking code module is automatically transmitted to and installed in the client system only by online connecting to the harmful information management server, so that the harmful information detected on the client system can be actively blocked in real time without requiring a manual installation process.

35 Claims, 6 Drawing Sheets

FOREIGN PATENT DOCUMENTS

| | | | |
|---|---|---|---|
| JP | 10-240828 | A | 9/1998 |
| JP | 10-320336 | A | 12/1998 |
| JP | 10320336 | | 12/1998 |
| JP | 11025176 | | 1/1999 |
| JP | 11-025176 | A | 1/1999 |
| KR | 10-1999-0073343 | A | 10/1999 |
| KR | 10-0242973 | B1 | 11/1999 |
| WO | 97/36246 | A1 | 2/1997 |
| WO | 98/041919 | A1 | 9/1998 |
| WO | 99/49391 | A2 | 9/1999 |

OTHER PUBLICATIONS

Veldman, Frans. "Combating Viruses Heuristically", Virus Bulletin Conference, pp. 67–75, Sep. 1996, UK.
Office Action, The State Intellectual Property Office of China, Application No. 00817894.1, dated Mar. 12, 2004.
Office Action, European Patent Office, Application No. 00 981 892.3, dated Feb. 26, 2008.
Office Action, European Patent Office, Application No. 00 981 892.3, dated Dec. 22, 2008.
Office Action, Japan Patent Office, Application No. 2001–550634, dated Sep. 26, 2006.
Office Action, Korea Patent Office, Application No. 10–2000–0011282, dated May 25, 2001.
Office Action, Korea Patent Office, Application No. 10–2000–0011282, dated Dec. 19, 2001.
PCT International Preliminary Examination Report, Application No. PCT/KR2000/001374, dated Mar. 18, 2005.
"Virus infection is prevented like this", Nikkei Business Publications, Inc., pp. 134–143, Nov. 2, 1998, Japan.
"Competition with the accuracy of monitoring and repulsing Illegal access and finding criminal thereof", Nikkei Business Publications, Inc., pp. 102–109, Oct. 18, 1999, Japan.
"Norton Antivirus 5.0 Deluxe eases Online Service and Support", Symantec Press Centre, http://www.symantec.com/region/can/eng/press/1998/n981103.html. Nov. 3, 1998, USA.
Setaro, Jeffrey A., "Norton Antivirus 5.0 All Grown Up", dacs.docs. electric, http:/www.dacs.org/archive/9812/feature3.htm, retrieved Dec. 13, 2004. USA.

* cited by examiner

SYSTEM AND METHOD FOR BLOCKING HARMFUL INFORMATION ONLINE, AND COMPUTER READABLE MEDIUM THEREFOR

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of PCT/KR00/01374, filed Nov. 28, 2000, which was published in the English language on Jul. 12, 2002 under Publication No. WO 01/50344, and the disclosure of which is incorporated herein by reference.

BACKGROUND OF THE INVENTION

The present invention relates to computer security systems, and more particularly, to a system and method for diagnosing, remedying and blocking harmful information including computer viruses online over a computer network via which a client is linked to a web server.

With the development of computer network based technologies, and lo particularly, the World Wide Web ("the Web") technology, the number of users on computer networks, and particularly, on the Internet, is rapidly expanding. Now, the Internet is no longer a new technology and service field in virtual space, but is getting into the realities of life. An ever-growing number of businesses, for example, shopping, auction, banking and advertising businesses, have established a presence on the Internet. Computer users now routinely employ the Internet to access various information, and conduct a variety of economical activities.

The Internet provides convenience to computer users in various ways. On the other hand, as computer and Internet related technologies have grown, concerns about highly possible illegal extraction of personal information or damage caused by a variety of computer viruses through computer networks are also quickly increasing. The damage caused by harmful information such as computer viruses can be serious. Reportedly, the amount of worldwide damage by computer viruses in the first half of 1999 marked a three-fold jump at $7,6 billion over 1998's $2.5 billion.

For example, the Chernobyl (CIH) virus, which is a high-risk computer virus, corrupted all of the data on a hard disk, and caused tremendous damage in the world including Korea. Recently, new harmful information such as the Back Orifice virus, or the School Bus virus which implants a "spy" file capable of remote controlling a computer, into computers along with other computer viruses, to thereby illegally extract personal information from the computers, has been introduced onto the Internet.

An existing counterplan for protection against various harmful information is based on the first damage/post-repair policy. This protection counterplan assumes a passive position by taking measures (for example, follow-up development of appropriate antivirus programs) after computer systems have been suffered from unidentified harmful information. Another disadvantage found in the protection policy lies in that a variety of antivirus programs for protecting against harmful information need to be manually installed on individual personal computers, which is an inefficient process overloading computer users with the installation activity. Furthermore, since various harmful information is created and distributed ever quickly through the Internet, it is not easy to consistently equip computers with the latest releases of antivirus programs.

Thus, if new harmful information, such as new species of computer virus, against which appropriate antivirus programs have not been developed yet, infiltrates a user computer, it is inevitable that the computer system is damaged by the new computer virus, or personal information is illegally drawn out of the computer system. In addition, a user must visit harmful information related service providers, or online communications companies to get the latest version of the antivirus program whenever an unidentified computer virus is discovered. Furthermore, downloading the latest version of the antivirus program is followed by manual installation, which is an unnecessary labor-intensive task.

The existing counterplan for protecting user computers from harmful information provides no communication channel for effectively reporting occurrences of harmful information or damage caused by the harmful information to the harmful information related service providers, so that statistical data on distribution of harmful information and damage caused by the harmful information, and the systematic data analysis thereof are not available to the harmful information related service providers.

BRIEF SUMMARY OF THE INVENTION

To solve the above problems, it is a first objective of the present invention to provide a system and method for blocking harmful information online, which allows a client system to actively block the harmful information, using a harmful information blocking program which is automatically transmitted and installed in the client system upon accessing to the web server via a computer network, and which inspects in real time file input/output (I/O) or network packet I/O on the client system.

It is a second objective of the present invention to provide a method for providing service of blocking harmful information online by a web server on a computer network.

It is a third objective of the present invention to provide a computer readable medium storing the harmful information blocking program.

An aspect of the first objective of the present invention is achieved by a method for blocking harmful information including computer viruses, the method comprising the steps of: (a) on a computer network through which a web server and a client system are linked to each other, the web server receiving a connection request from the client system over the computer network; (b) the web server transmitting a harmful information blocking code module to the client system; and (c) once the transmission of the harmful information blocking code module is completed, the harmful information blocking code module automatically running on the client system to block in real time harmful information including computer viruses.

Step (c) preferably comprises the steps of: (c1) inspecting file input/output (I/O) on the client system; (c2) determining on the client system whether files inspected in step (c1) are harmful or not; and (c3) appropriately treating a file determined to be harmful in step (c2) if it can be treated, and aborting execution of a file determined to be harmful in step (c2) if it cannot be treated. In step (c3), the web server may be provided 30 with information relating to the file determined to be harmful in step (c2).

Alternatively, step (c) may comprise the steps of: (c1) inspecting network packet input/output (I/O) on the client system; (c2) determining on the client system whether packets inspected in step (c1) are harmful or not and (c3) if any packet is determined to be harmful, blocking a communication port assigned for the packet I/O.

The harmful information blocking code module executed in step (c) preferably displays its running status in a separate window, and the execution of the harmful information blocking code module is aborted when the separate window is closed. It is preferable that the harmful information blocking code module executed in step (c) continue to run on the client system even when the client system accesses another web server. It is preferable that the harmful information blocking code module transmitted in step (b) is an ActiveX™ or Java™ program.

In another embodiment, the present invention provides a method for blocking harmful information including computer viruses, the method comprising the steps of: (a) on a computer network through which a first web server, a second web server and a client system are linked to each other, the client system connecting to the second web server over the computer network; (b) the client system connecting to the first web server over the computer network, according to information provided from the second web server to the client system; (c) the first web server transmitting a harmful information blocking code module to the client system; and (d) once the transmission of the harmful information blocking code module is completed, the harmful information blocking code module automatically running on the client system to block in real time harmful information including computer viruses.

The second objective of the present invention is achieved by an online service providing method for blocking harmful information including computer viruses, the method comprising the steps of: (a) on a computer network through which a first web server and a client system are linked to each other, constructing a homepage on the first web server for online service; (b) the first web server receiving a connection request from the client system over the computer network; and (c) the first web server transmitting a harmful information blocking code module to the client system, the harmful information blocking code module automatically running on the client system to block in real time harmful information including computer viruses.

It is preferable that the connection request received by the first web server in step (b) be issued by the client system according to information provided from a second web server after the client system is connected to the second web server separated from the first web server.

Another aspect of the first objective of the present invention is achieved by a system for blocking harmful information including computer viruses, comprising: a first web server for providing online services through a computer network; and a client computer linked with the first web server via the computer network, wherein when the client computer is connected to the first web server via the computer network, the first web server transmits a harmful information blocking code module to the client computer, and the harmful information blocking code module is automatically executed on the client computer to block in real time harmful information including computer viruses.

It is preferable that the harmful information blocking system further comprise a second web server linked to the client computer through the computer network to provide online services through the computer network, wherein when the client computer is connected to the second web server through the computer network, the second web server provides the client computer with hyperlink information used to access the first web server.

The third objective of the present invention is achieved by a computer readable medium having recorded thereon a computer program for blocking harmful information, the computer program transmitted from a web server to a client system through a computer network, and automatically executed on the client system, wherein the blocking of harmful information comprises the step of: (a) inspecting file input/output(I/O) of the client system;(b) determining on the client system whether files inspected in step (a) are harmful or not; (c) appropriately treating a file determined to be harmful in step (b) if it can be treated, and aborting execution of a file determined to be harmful in step (b) if it cannot be treated; and (d) providing the web server with information relating to the file determined to be harmful in step (b).

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1A:
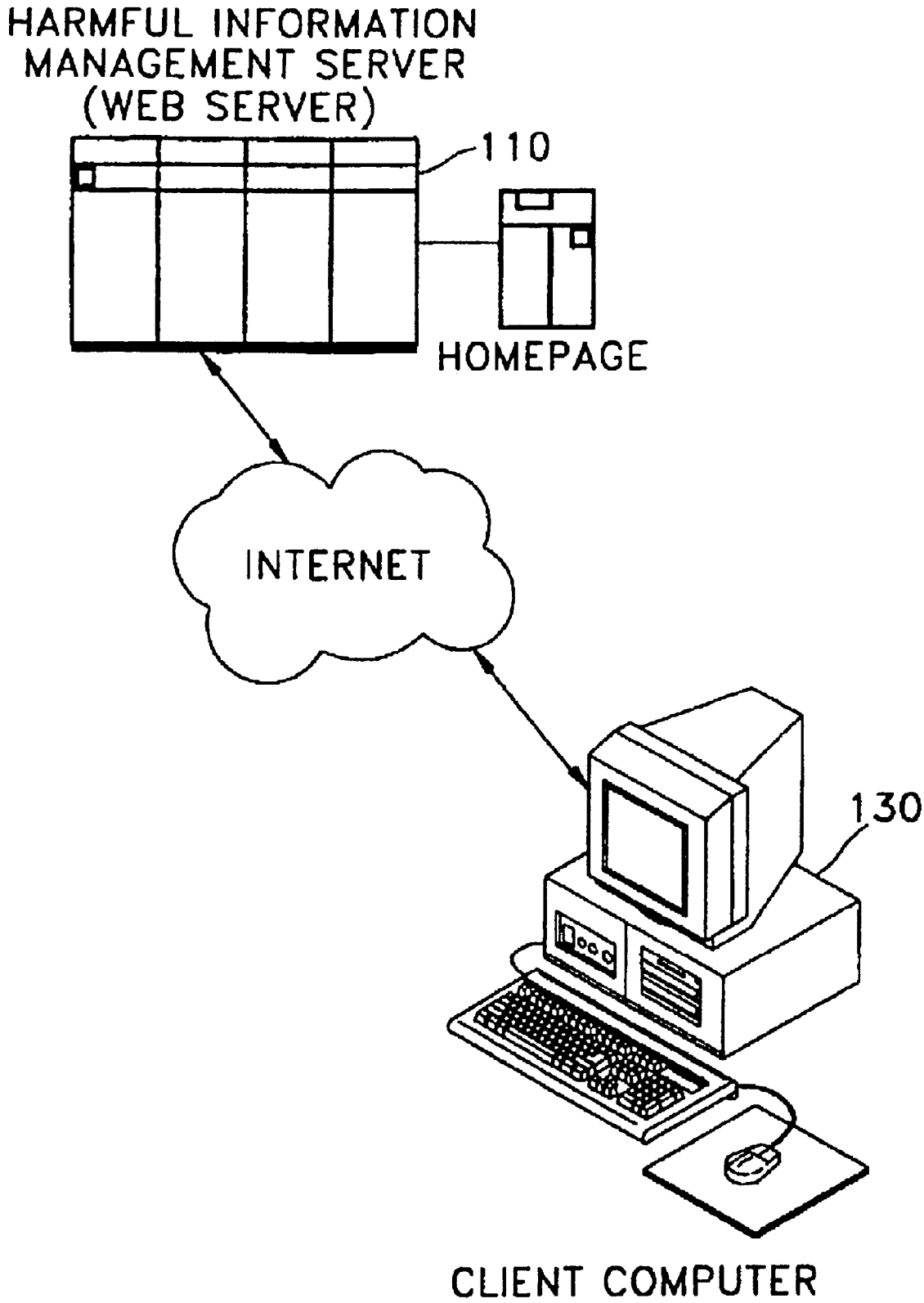
FIGS. 1A and 1B are schematic views of systems applied to implement the present invention.

As shown in FIG. 1A, which illustrates a system applicable to implement a preferred embodiment of the invention, a harmful information management server 110, which is a web server, has a homepage, and is linked with a client computer 130 via a computer network, such as the Internet.

The harmful information management server 110 provides an online service for providing a harmful information blocking code module, which is capable of blocking in real time harmful information, to the client computer130. The term "harmful information" collectively refers to an undesirable object or action that adversely effects computer systems and/or computer networks, including computer viruses, undesirable lascivious web sites on the Internet, and the act of illegally extracting personal information.

Figure 2A:
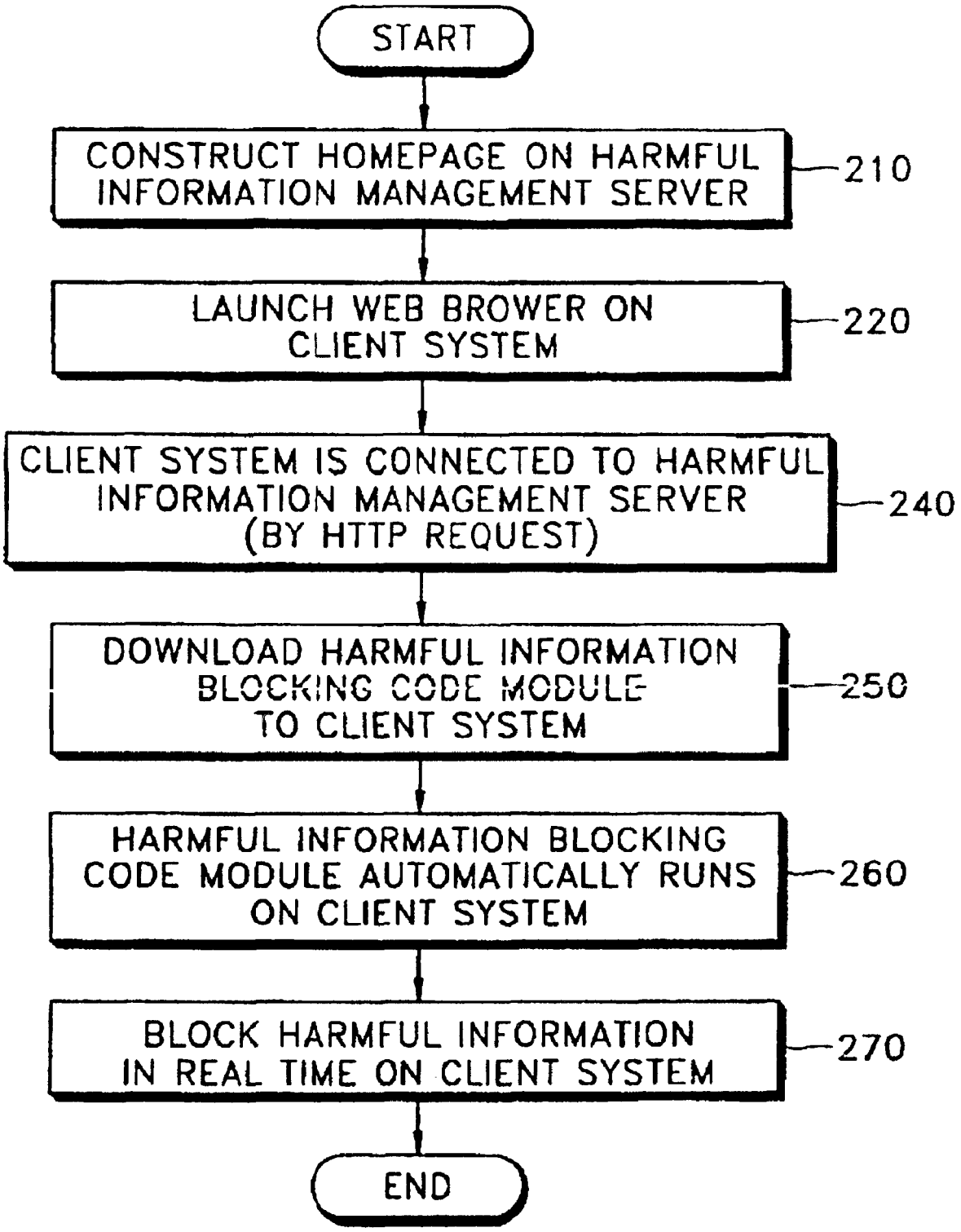
FIGS. 2A and 2B are flowcharts illustrating preferred embodiments of a method for blocking harmful information online according to the present invention.

The operation of the system shown in FIG. 1A is illustrated in FIG. 2A. A first embodiment of a method for blocking harmful information online according to the present invention will be described with reference to FIG. 2A.

The method begins with a homepage being constructed for online services on the harmful information management server 110 (step 210). A computer user launches a web browser on the client computer (hereinafter, referred to as merely "client") 130 (step 220). When the client 130 is connected to the harmful information management server 110 (step 240), the harmful information management server 110 transmits a harmful information blocking code module to the client 130 (step 250).

For this case, the connection between the client 130 and the harmful information management server 110 is accomplished by a HyperText Transfer Protocol formatted request (HTTP request), and the transferring of the harmful information blocking code module from the harmful information management server 110 to the client 130 is performed by a HTTP response. In general, the HTTP request is carried out by typing the Universal Resource Locator (URL) of the harmful information management server 110 or clicking a hyperlink associated with the URL on the web browser.

Preferably, the harmful information blocking code module is an executable application program which runs on the client 130. For example, there are ActiveX™ controls designed for use in the Windows environment developed by the Microsoft Corporation, and Java™ applets and JavaScript™, which can be executed by web browser. Alternatively, an object coded program designed with a high-level language may be linked to a web browser to run.

It is preferable that the harmful information blocking code module be executed in connection with a separate window provided for user interface, and a status report for the harmful information blocking code module is displayed in the separate window. In this manner, upon the linking of the client 130 to the harmful information management server 110, first the 3o harmful information management server 110 provides an HTTP response which enables the creation of a separate window, and then provides the harmful information blocking code module as an HTTP response with respect to a HTTP request issued from the client 130. When the window is closed, the execution of the harmful information blocking code module is aborted. The separate window provided for user interface is applicable for various purposes, other than for displaying the running status of the harmful information blocking code module. For example, various kinds of news or banner advertisements may appear in the separate window.

When the transfer of the harmful information blocking code module is completed, the harmful information blocking code module is automatically executed on the client 130 (step 260) and blocks in real time harmful information including computer viruses (step 270). Since the harmful information blocking code module runs in real time on the client 130, unless the status displaying window is closed, the harmful information blocking code module continues to run on the client 130 even when the client 130 attempts linking to another web server. Thus, the client 130 can be provided with a harmful information blocking service for security, by a single connection to the harmful information management server 110.

Figure 1B:
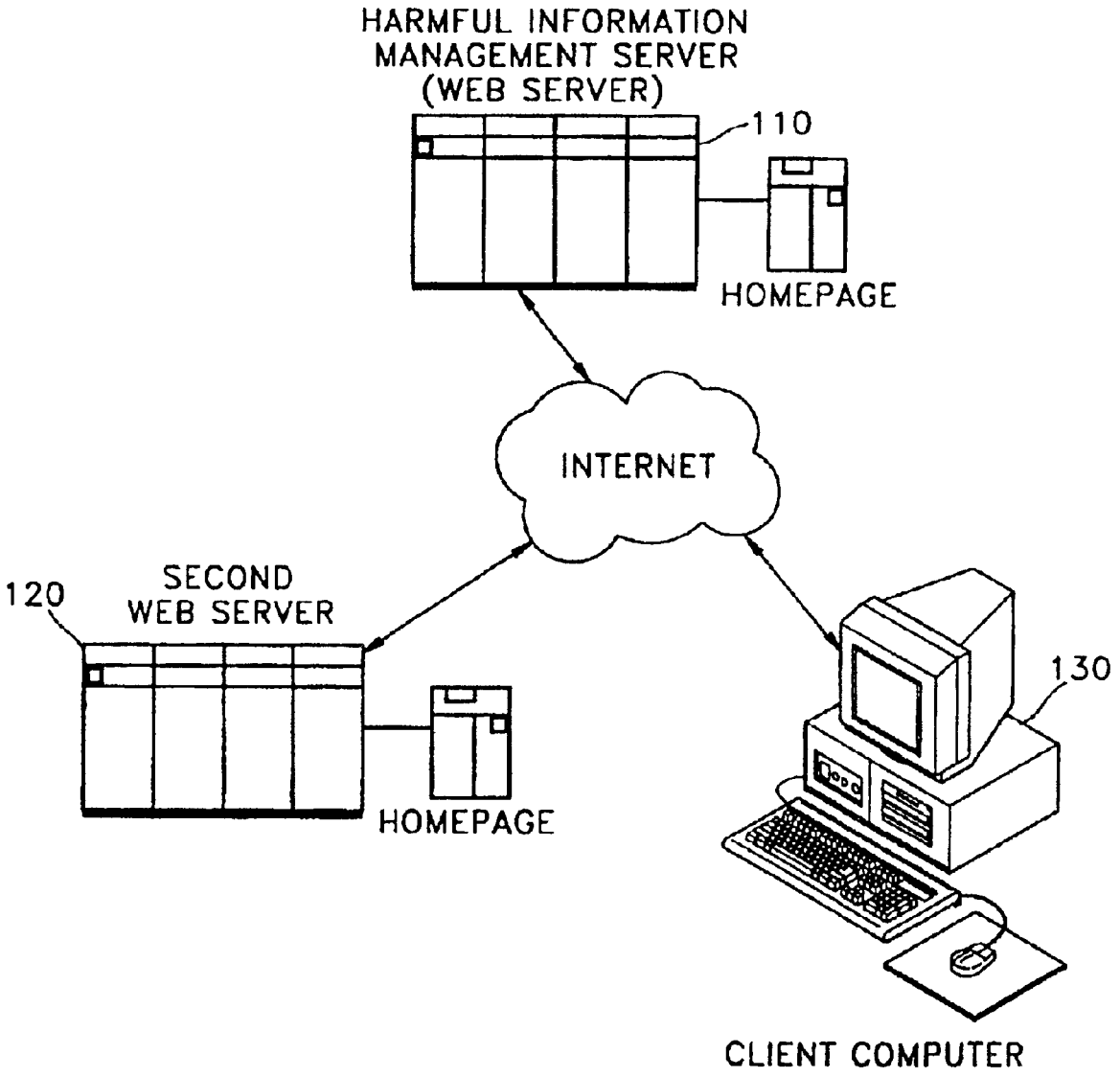
Figure 2B:
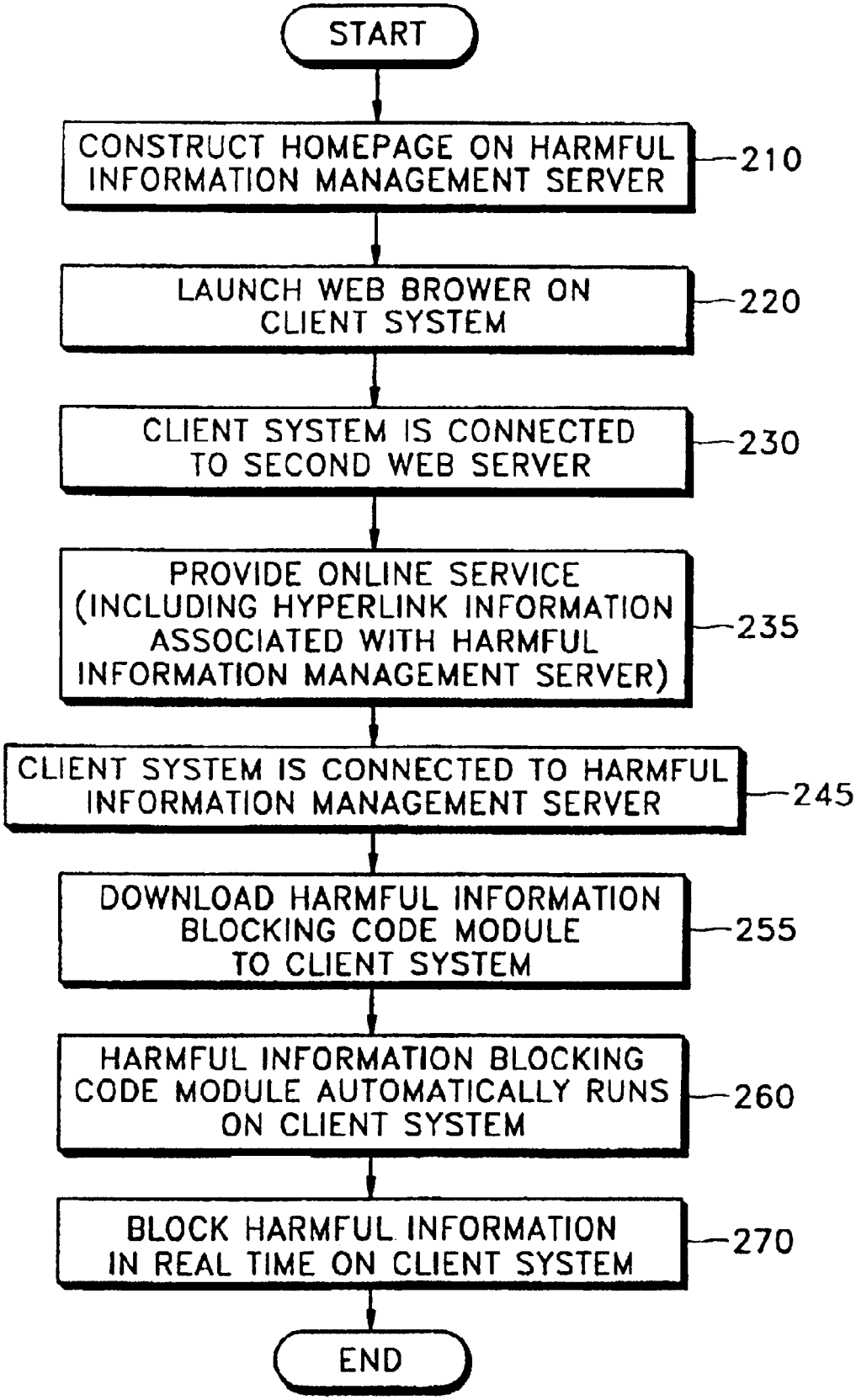

Prior to description of the mechanism of the harmful information blocking code module, a variation (hereinafter, referred to as "second embodiment") of the embodiment described with reference to FIG. 1A will be described. FIG. 1B illustrates the configuration of a system applied for the second embodiment according to the present invention, and FIG. 2B is a flowchart illustrating the second embodiment of the method for blocking harmful information online according to the present invention.

As shown in FIG. 1B, the system further comprises a web server 120 (hereinafter, referred to as "second web server"), other than the harmful information management server 110, for providing online services on a network. The second web server 120 is a common web sever linked with a client system via a computer network such as the Internet.

In the present embodiment, referring to FIG. 2B, step 210 and step 220 are carried out in the same way as in the first embodiment described with reference to FIG. 2A. Next, the client 130 primarily accesses the second web server 120 (step 230).

Since the second web server 120 provide hyperlink information for use in accessing the harmful information management server 10 as well as information relating to online services to the client 130 (step 235). It is preferable that the hyperlink information is not link information for the front homepages of the harmful information management server 10, but link information that directly enables the client 130 to receive the harmful information blocking code module from the harmful information management server 110 through a separate window.

Next, the client 130 performs an HTTP request to the harmful information management server 10, according to the hyperlink information from the second web server 120 (step 245). The harmful information management server 10 transmits the harmful information blocking code module, which is an HTTP response with respect to the HTTP request issued from the client 130 (step 255).

When the transfer of the harmful information blocking code module is completed, the harmful information blocking code module is automatically executed on the client 130 (step 260), and blocks in real time harmful information such as computer viruses (step 270), as in the first embodiment.

Figure 3:
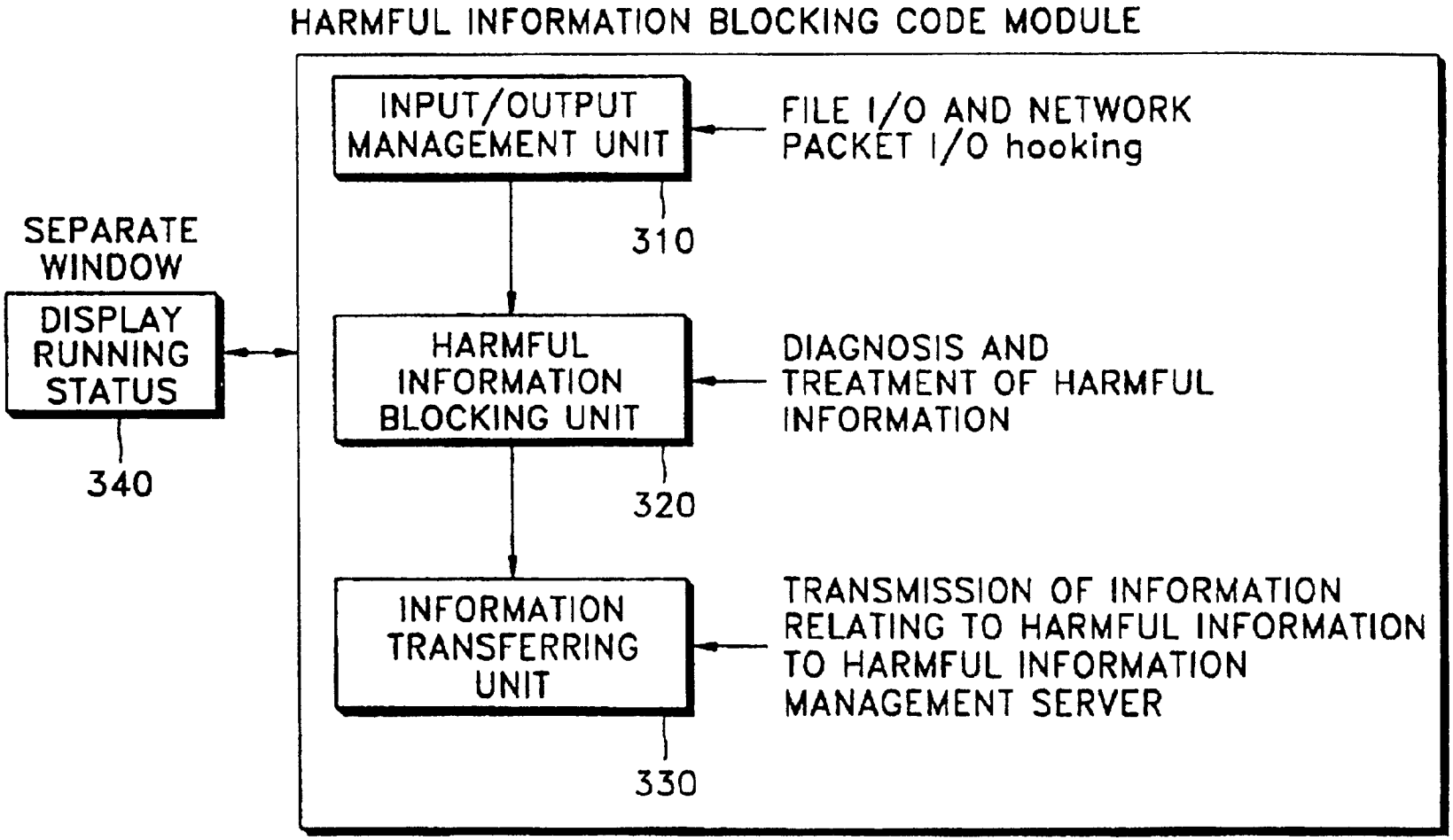
FIG. 3 is a schematic view showing the configuration of an example of a harmful information blocking code module adopted in the present invention.
Figure 4:
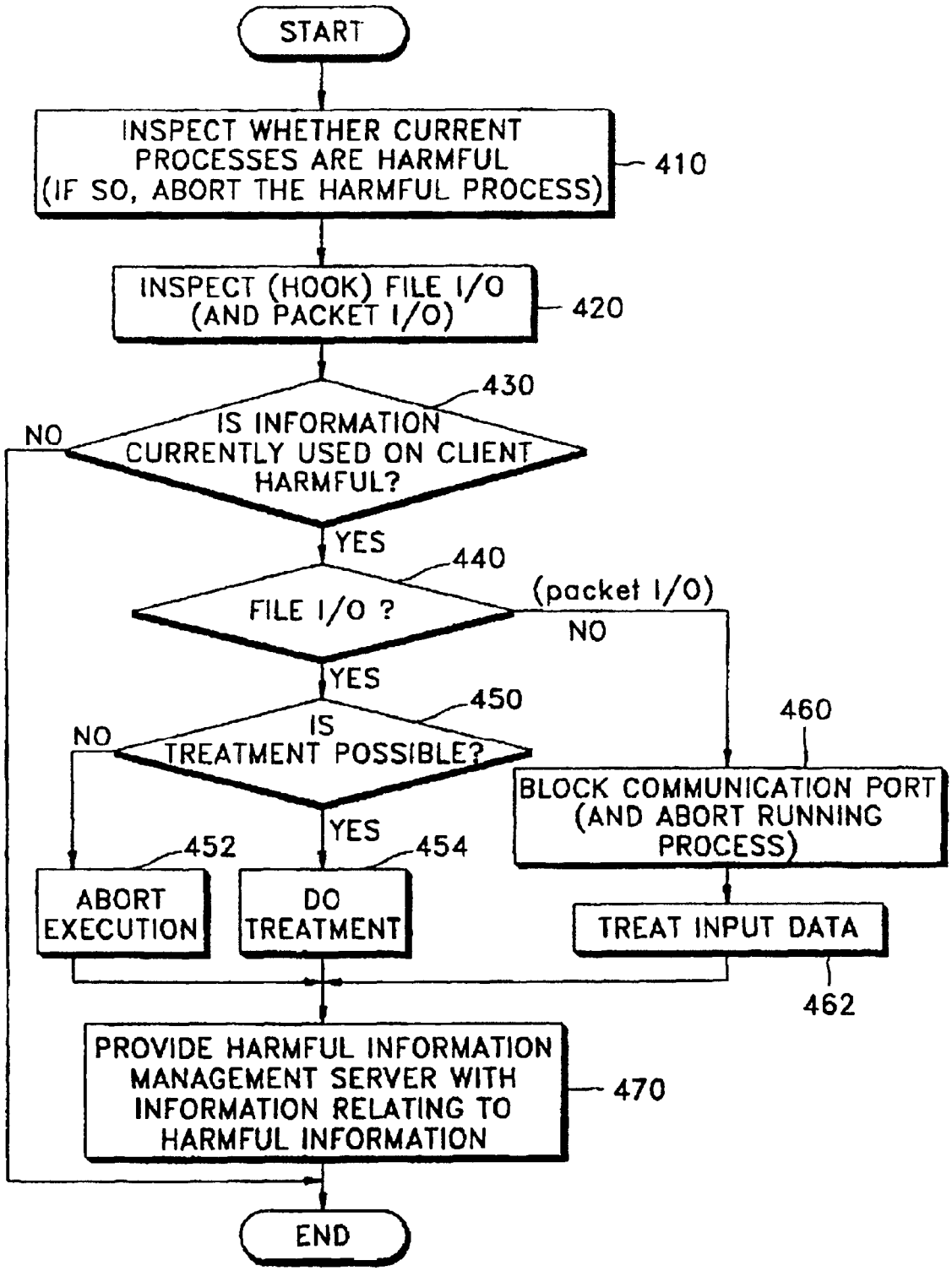
FIG. 4 is a flowchart illustrating the operation of the harmful information blocking code module shown in FIG. 3.

The harmful information blocking code module will now be described in greater detail. FIG. 3 shows the configuration of an example of the harmful information blocking code module adopted in the present invention, and FIG. 4 is a flowchart illustrating the operation of the harmful information blocking code module shown in FIG. 3.

As shown in FIG. 3, the harmful information blocking code module includes an input/output management unit 310, a harmful information blocking unit 320, and an information transferring unit 330. The harmful information blocking code module is related to a separate window 340 on which its running status is displayed, and execution of the harmful information blocking code module aborts upon the closing of the separate window 340, as previously described.

The input/output management unit 310 inspects file input/output (I/O) on the client 130. The inspection of the file I/O refers to the action taken to get file information by hooking up file I/O routines. Preferably, the input/output management unit 310 also inspects network packet I/O on the client 130 so as to block harmful information from the network. A computer virus capable of illegally extracting personal information, such as the Back Orifice virus, may be blocked by checking file I/O, or checking processes, which will be described below. Preferably, the input/output management unit 310 further has a function for monitoring any Internet address that the client 130 attempts accessing, which prevents computer users from accessing undesirable lascivious web sites.

The harmful information blocking unit 320 diagnoses whether or not a file or packet is harmful, and takes appropriate remedial action if the file or packet is harmful. The information transferring unit 330 informs the harmful information management server 110 of information on the file or packet determined to be harmful.

In the operation of the harmful information blocking code module, referring to FIG. 4, first the harmful information blocking code module, which is automatically executed on the client 130, inspects whether processes currently running on the client 130 are harmful or not (step 410). This is because all future processes can be influenced by the current processes in memory. Another reason for this is that the Back Orifice virus capable of illegally extracting personal information from a system, operates in the form of processes, and enables an external computer system to remote control a user computer.

A method for checking whether or not processes are harmful involves making a list of the ongoing processes loaded in the memory, and examining whether the files corresponding to each of the processes are harmful or not. If a file is determined to be harmful, the corresponding process is determined to be a harmful process and is then aborted. It is appreciated that an appropriate treatment may also be performed on the corresponding harmful file, Preferably, after the detection of harmful information and before performing appropriate treatment, the harmful information blocking code module informs a user of the presence of the harmful information, and requests the user's approval to take remedial action.

Next, the harmful information blocking code module inspects every file I/O on the client 140 (step 420). As previously mentioned, the file I/O inspection is performed by hooking up file I/O routines. For example, V×D, which is the I/O routine under the Windows environment, may be hooked up for the inspection.

In step 420, network packet I/O may be inspected along with the file I/O so as to block harmful information infiltrating from a network, which was also previously mentioned. The network packet I/O inspection may be accomplished by hooking up socket I/O routines (such as the so-called "Winsock module" in the Windows environment).

Furthermore, as previously mentioned, in step 420, any Internet address that the client 130 attempts to access, may be further monitored, is which prevents the accessing of undesirable lascivious web sites. This monitoring for preventing undesirable accessing can be accomplished by checking the header of a HTTP request message or a Domain Name Service (DNS) lookup message.

In other words, step 420 may involve additional functions for checking for possible occurrences of harmful information on the client 130. Subsequent operations of the harmful information blocking code module will be described with reference to file I/O inspection, however, file I/O inspection is only an example and should not be contrived as limiting the scope of the invention.

Next, it is determined whether files, which are monitored in step 420, are harmful or not (step 430). This determination can be performed by various methods, according to the type of harmful information or the necessities of applications. For example, a pattern comparison with known harmful information, for example, identified computer viruses, may be performed for the purpose of the determination. In general, computer viruses operate in a predetermined pattern, and thus the pattern comparison technique can be a tool for identifying new species of viruses.

In step 430, it is preferable to make a determination as to whether or not a network packet is harmful, or whether the client 130 attempts to access an undesirable lascivious web site.

If it is determined that the monitored information is safe, the harmful information code module performs no specified treatment on the file. Accordingly, a user is allowed to continue his or her task on the client 130 irrespective of the harmful information code blocking module.

If the monitored information is determined to be harmful, it is further determined whether the monitored information is related to file I/O or packet I/O to provide a proper treatment consistent with the harmful file or packet. Although not shown in FIG. 4, as for blocking access to an desirable lascivious web site, a HTTP request message can be reformulated to guide the client 130 to a desirable web site good for users.

In the case where the monitored information is related to file I/O, it is determined whether the harmful file can be properly treated (step 450). If the treatment is possible, the related file is treated (step 454). If the treatment is impossible, execution of the corresponding file is merely aborted (step 452). In step 454, it is preferable to notify a user that harmful information was detected, and to request approval for performing treatment on the harmful information.

Lastly, it is preferable to notify the harmful information management server 110 if information indicative of harmful information is detected from the client 130 online, using the harmful information blocking code module (step 470). If the detected information is a new kind of harmful information and thus cannot be treated, it is preferable to transmit the entire file related to the unidentified harmful information to the harmful information management server 110. Of course, it is preferable to get pre-approval regarding notification of the harmful information detection and/or the transmission of the unidentified harmful information file to the harmful information management server 110.

In other words, the present embodiment provides the function of automatically providing the harmful information management server 110 with information on harmful information detected in the client 130. Accordingly, the harmful information management server 110 is allowed to acquire statistical data on harmful information, and can thus instantaneously counteract the occurrence of an unidentified computer virus, for example, by developing an effective antivirus program. In this manner, the harmful information management server 110 analyzes the unidentified harmful information from the client 130 to develop a proper treatment program, and provides an appropriate security service for blocking harmful information from attacking the client 130, with the latest version of the harmful information blocking code module. Therefore,-the present invention can prevent user computers operating in an open network environment from damage caused by various harmful information.

In the present embodiment, a communications channel for use by the harmful information blocking code module in automatically transmitting harmful information to the harmful information management server 110 may be implemented with Internet mail transfer protocol such as Simple Mail Transfer Protocol (SMTP), or File Transfer Protocol (FTP). More preferably, a specified communication channel is provided exclusively for the transmission of the harmful information.

Meanwhile, if it is determined in step 440 that harmful information is related with packet I/O, a communication port assigned for the packet I/O is blocked (step 460). If internal processes for supporting the network packet I/O via the communication channel is in progress, it is preferable to abort the processes.

Next, a proper treatment is performed on the harmful information infiltrating through the communications port in a similar way as for the harmful information related with file I/O (step 462). In step 470, the harmful information management server 110 is informed of the detection of the harmful information from the network packet I/O.

The present embodiments may be implemented as a computer readable program code. The invention may be embodied in a general purpose digital computer by running a program from a computer readable medium, including but not limited to magnetic storage media (e.g., ROM's, floppy disks, hard disks, etc.), optically readable media (e.g., CD-ROMs, DVDs, etc.) and carrier waves (e.g., transmissions over the Internet).

While this invention has been particularly shown and described with reference to preferred embodiments thereof, it will be understood by those skilled in the art that various changes in form and details may be made thereto without departing from the spirit and scope of the invention as defined by the appended claims. The embodiments should be construed as being illustrative and not as limiting the scope of the invention. Accordingly, the scope of the present invention is defined by the appended claims rather than the foregoing description.

INDUSTRIAL APPLICABILITY

As previously described, according to the present invention, the harmful information blocking code module is automatically provided to and installed in the client system by only online connecting to the harmful information management server, so that harmful information detected on the client system can be actively blocked in real time without requiring a manual installation process.

The harmful information blocking code module has a function of informing the harmful information management server of information indicative of an unidentified computer virus detected in the client system. Accordingly, the harmful information management server can acquire useful statistical data relating to harmful information, and keeps up-to-date with the latest releases of the harmful information blocking code module, which ensures latest security service for user computers.

Furthermore, the harmful information blocking code module is able to inspect the network packet I/O, which warrants secured electronic commerce through the Internet. In particular, for private enterprises or government organizations, the present invention can be effective in actively protecting business information, or confidential information relating to national security from various harmful information. The present invention is effective in terms of both security and efficiency.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for blocking in real time harmful information in a file to be executed, the method comprising the steps of:

(a) on a computer network through which a web server and a client system are linked to each other, the web server receiving a connection request from the client system over the computer network;

(b) the web server transmitting a harmful information blocking code module to the client system; and (c) once the transmission of the harmful information blocking code module is completed, the harmful information blocking code module automatically running on the client system to block in real time harmful information including computer viruses, wherein the step (c) comprises steps of:

(c1) inspecting file input/output (I/O) on the client system by hooking up file I/O routines, (c2) determining whether the file to be executed corresponding to the inspected file input/output in the step (c1) is harmful or not; and (c3) treating a file determined to be harmful in the step (c2) and executing the file, if it can be treated, and aborting the execution of the file determined to be harmful in the step (c2), if it cannot be treated.

2. The method of claim 1, wherein in the step (c3), if the file determined to be harmful in the step (c2) cannot be treated, the file is transmitted to the web server.

3. The method of claim 1, wherein the step (c3) comprises requesting the client system user's approval for the execution of the step (c3).

4. The method of claim 1, wherein the step (c) further comprises steps of:

(c4) inspecting network packet input/output (1/0) on the client system;

(c5) determining whether packets inspected in the step (c4) are harmful or not; and (c6) if any packet is determined to be harmful, blocking a communication port assigned for the packet I/O.

5. The method of claim 1, wherein the harmful information blocking code module executed in the step (c) checks whether current processes running on the client system are harmful or not.

6. The method of claim 1, wherein the harmful information blocking code module executed in the step (c) displays its running status in a separate window, and the execution of the harmful information blocking code module is aborted when the separate window is closed.

7. The method of claim 1, wherein the harmful information blocking code module executed in the step (c) continues to run on the client system even when the client system accesses another web server.

8. A method for blocking in real time harmful information in a file to be executed, the method comprising the steps of:

(a) on a computer network through which a first web server, a second web server and a client system are linked to each other, the client system connecting to the second web server over the computer network;

(b) the client system connecting to the first web server over the computer network, according to information provided from the second web server to the client system;

(c) the first web server transmitting a harmful information blocking code module to the client system; and (d) once the transmission of the harmful information blocking code module is completed, the harmful information blocking code module automatically running on the client system to block in real time harmful information including computer viruses, wherein the step (d) comprises steps of:

(d1) inspecting file input/output (I/O) on the client system by hooking up file I/O routines;

(d2) determining whether the file to be executed corresponding to the inspected file input/output in the step (d1) is harmful or not; and (d3) treating a file determined to be harmful in the step (d2) and executing the file, if it can be treated, and aborting execution of the file determined to be harmful in the step (d2), if it cannot be treated.

9. The method of claim 8, wherein the harmful information blocking code module executed in the step (d) continues to run on the client system even when the client system accesses another web server.

10. A method for blocking in a real time harmful information in a file to be executed in real time, the method comprising steps of:

(a) on a computer network through which a first web server and a client system are linked to each other, the first web server receiving a connection request from the client system over the computer network;

(b) the connection request is issued by the client system according to information provided from a second web server after the client system is connected to the second web server separated from the first web server;

(c) once the first web server transmits a harmful information blocking code module to the client system, the harmful information blocking code module automatically running on the client system to block in real time harmful information including computer viruses, wherein the step (d) comprises steps of:

(c1) inspecting file input/output (I/O) on the client system by hooking up file I/O routines;

(c2) determining whether the file to be executed corresponding to the inspected file input/output in the step (c1) is harmful or not; and (c3) treating a file determined to be harmful in the step (c2) and executing the file, if it can be treated, and aborting execution of the file determined to be harmful in the step (c2), if it cannot be treated.

11. The method of claim 10, wherein the harmful information blocking code module transmitted in the step (c) continues to run on the client system even when the client system accesses another web server.

12. A system for blocking in real time harmful information in a file to be executed, comprising:

a first web server for providing online services through a computer network; and a client computer linked with the first web server via the computer network, wherein when the first web server receives a connection request from the client system, the first web server transmits a harmful information blocking code module to the client computer, and the harmful information blocking code module is automatically executed on the client computer to block in real time harmful information including computer viruses, and wherein the harmful information blocking code module inspect file input/output (I/O) on the client system by hooking up file I/O routines, and determines whether the file to be executed corresponding to the inspected file input/output is harmful or not: and treats a file determined to be harmful and executes the file, if it can be treated, and aborts the execution of the file determined to be harmful, if it cannot be treated.

13. The system of claim 12, wherein the harmful information blocking code module displays its running status on a separate window, and the execution of the harmful information blocking code module is aborted when the separate window is closed.

14. The system of claim 12, further comprising a second web server linked to the client computer through the computer network to provide online services through the computer network, and wherein when the client computer is connected to the second web server through the computer network, the second web server provides the client computer with hyperlink information used to access to the first web server.

15. The system of claim 12, wherein the harmful information blocking code module continues to run on the client computer even when the client computer accesses another web server.

*16. A method for blocking harmful information, the method comprising:*

*receiving a request from a client system;*

*transmitting a harmful information blocking code module to the client system;*

*wherein the harmful information blocking code module runs on the client system to block in real time harmful information when the transmission of the harmful information blocking code module is completed, the harmful information blocking code module configured to:*

*inspect network packet input/output (I/O) on the client system,*

*determine whether at least one of packets transmitted to the inspected network packet I/O is harmful or not, and*

*block an internal process for supporting the network packet I/O, if any packet is determined to be harmful.*

*17. The method of claim 16, wherein the harmful information blocking code module intercepts at least one of network packet input/output routines to inspect the network packet input/output.*

*18. The method of claim 16, wherein the internal process comprises at least one of socket I/O routines.*

*19. The method of claim 16 wherein the harmful information blocking code module automatically runs on the client system when the transmission of the harmful information blocking code module is completed.*

*20. The method of claim 16, wherein the harmful information blocking code module displays advertising contents in a separate window.*

*21. The method of claim 16, wherein the harmful information blocking code module is an object coded program linked to a web browser.*

*22. The method of claim 21, wherein the object coded program is ActiveX control, Java applet or Java script.*

*23. A method for blocking harmful information, the method comprising:*

*sending a request to download a harmful information blocking code module;*

*downloading the harmful information blocking code module;*

*wherein the harmful information blocking code module automatically runs on a client system to block in real time harmful information when the downloading of the harmful information blocking code module is completed, the harmful information blocking code module configured to:*

*inspect network packet input/output (I/O) on the client system,*

*determine whether at least one of the packets transmitted to the inspected network packet I/O is harmful or not, and*

*block an internal process for supporting the network packet I/O, if any packet is determined to be harmful.*

*24. The method of claim 23, wherein the harmful information blocking code module intercepts at least one of network packet input/output routines to inspect the network packet input/output.*

*25. A method for blocking harmful information, the method comprising:*

*receiving a request from a web server connected to a client system;*

*transmitting a harmful information blocking code module to the client system;*

*wherein the harmful information blocking code module runs on the client system to block in real time harmful information when the transmission of the harmful information blocking code module is completed, the harmful information blocking code module configured to:*

*inspect network packet input/output (I/O) on the client system,*

*determine whether at least one of the packets transmitted to the inspected network packet I/O is harmful or not, and*

*block an internal process for supporting the network packet I/O, if any packet is determined to be harmful.*

*26. The method of claim 25, wherein the harmful information blocking code module intercepts at least one of network packet input/output routines to inspect the network packet input/output.*

*27. The method of claim 25, wherein the internal process comprises at least one of socket I/O routines.*

*28. The method of claim 25, wherein the packet comprises the header of a HTTP request message or a DNS lookup message.*

*29. The method of claim 25, wherein the harmful information blocking code module displays advertising contents in a separate window.*

*30. The method of claim 25, wherein the harmful information blocking code module is an object coded program linked to a web browser.*

*31. The method of claim 30, wherein the object coded program is ActiveX control, Java applet or Java script.*

*32. A method for blocking harmful information, the method comprising:*

*sending a request to a web server connected to a client system;*

*downloading a harmful information blocking code module;*

*wherein the harmful information blocking code module automatically runs on the client system to block in real time harmful information when the downloading of the harmful information blocking code module is completed, the harmful information blocking code module configured to:*

*inspect file input/output (I/O) on the client system by intercepting at least one of file I/O routines,*

*determine whether a file to be executed corresponding to the inspected file input/output is harmful or not, and*

*abort the execution of the file determined to be harmful.*

*33. The method of claim 32 wherein the harmful information blocking code module is further configured to allow the execution of the file determined not to be harmful.*

*34. The method of claim 32 wherein the harmful information blocking code module is further configured to treat the file determined to be harmful, if it can be treated.*

*35. The method of claim 32 wherein the harmful information blocking code module is further configured to transmit the file to another web server, if the file determined to be harmful cannot be treated.*

* * * * *

UNITED STATES PATENT AND TRADEMARK OFFICE

CERTIFICATE OF CORRECTION

PATENT NO. : RE42,196 E
APPLICATION NO. : 12/137871
DATED : March 1, 2011
INVENTOR(S) : Yeon-Sub Jung It is certified that error appears in the above-identified patent and that said Letters Patent is hereby corrected as shown below:

On the title page, column 1, item (30), correct the Foreign Application Priority Data as follows:

Mar. 7, 2000 (KR) 2000-11282
Dec. 31, 1999 (KR) 1999-68606

Signed and Sealed this
Third Day of September, 2013

Teresa Stanek Rea
*Acting Director of the United States Patent and Trademark Office*